United States Patent [19]

Rodgers, Sr. et al.

[11] Patent Number: 5,075,982

[45] Date of Patent: Dec. 31, 1991

[54] OPEN TOP DEFLUXER WITH IMPROVED SOLVENT VAPOR RECOVERY

[75] Inventors: Joel E. Rodgers, Sr., Convent Station, N.J.; Thomas W. Godlewski, Polos Hills, Ill.

[73] Assignee: Allied-Signal Inc., Morris Township, Morris County, N.J.

[21] Appl. No.: 587,893

[22] Filed: Sep. 25, 1990

[51] Int. Cl.$^5$ .................................... F26B 21/06
[52] U.S. Cl. .................................... 34/78; 134/11; 134/31; 134/40; 134/105; 202/170
[58] Field of Search .................... 34/73, 75, 77, 78; 134/11, 12, 31, 2, 40, 105, 108, 109; 202/169, 170

[56] References Cited

U.S. PATENT DOCUMENTS

| | | | |
|---|---|---|---|
| 1,938,841 | 12/1933 | Koch | 134/11 |
| 2,123,439 | 7/1938 | Savage | 134/11 |
| 2,310,569 | 2/1943 | Booth | 134/11 |
| 3,070,463 | 12/1962 | Barday | 134/12 |
| 3,196,046 | 7/1965 | Brite | 134/11 |
| 3,238,065 | 3/1966 | Fullhart, Jr. | 134/11 |
| 3,242,933 | 3/1966 | Huff | 134/11 |
| 3,375,177 | 3/1968 | Rand | 134/12 |
| 3,398,023 | 8/1968 | Jacobsen et al. | 134/11 |
| 3,424,177 | 1/1969 | Hamilton | 134/31 |
| 3,632,480 | 1/1972 | Surprenant et al. | 134/105 |
| 3,663,293 | 5/1972 | Surprenant et al. | 134/31 |
| 3,793,076 | 2/1974 | Lea | 134/31 |
| 3,904,102 | 9/1975 | Chu et al. | 134/31 |
| 4,023,983 | 5/1977 | Houke et al. | 134/31 |
| 4,029,517 | 6/1977 | Rand | 134/11 |
| 4,032,033 | 6/1977 | Chu et al. | 134/31 |
| 4,210,461 | 7/1980 | Moree et al. | 134/31 |
| 4,261,111 | 4/1981 | Rand | 34/73 |
| 4,289,586 | 9/1981 | Sabatka | 203/1 |
| 4,486,239 | 12/1984 | du Fresne | 134/11 |
| 4,489,508 | 12/1984 | Carlson, Jr. et al. | 34/78 |
| 4,556,456 | 12/1985 | Ruckriegel et al. | 134/31 |
| 4,558,524 | 12/1985 | Peck et al. | 34/78 |
| 4,755,261 | 7/1988 | McCord et al. | 203/4 |
| 4,800,362 | 1/1989 | Sasaki et al. | 34/78 |

Primary Examiner—Henry A. Bennet
Assistant Examiner—Denise L. F. Gromada
Attorney, Agent, or Firm—Jay P. Friedenson

[57] ABSTRACT

A vapor degreasing open topped defluxer is disclosed in which cleaning solvent vapors are generated by boiling a liquid solvent in an open topped tank with the parts to be cleaned inserted therein through the open top. The open topped tank is formed from plural upright sidewalls connected to a bottom wall. Heating elements disposed in the tank bottom vaporize the solvent such that the generated heated solvent vapors rise above the liquid solvent to contact the parts to be cleaned and dissolve the grease on the parts. A condenser coil supported within the tank above the liquid solvent condenses the solvent vapors and defines an upper limit or vapor line of the solvent vapor zone located above the liquid solvent and below uppermost edges of the upright sidewalls. The light rising solvent vapors have a natural tendency to rise upwardly out of the tank by following a convection flow path generally along the inner surfaces of the sidewalls and upwardly past the uppermost edges thereof. To control the expulsion of vapors into the surrounding ambient environment, the uppermost edges are formed with a downwardly and inwardly turned lip coextensive with the length and width of the tank. The lip intercepts the convection flow path to deflect the light rising vapors both inwardly and downwardly back towards the condenser coil. The invention also discloses a removably attachable tank extension which may be attached to the existing tank sidewalls to increase the freeboard height of the tank. The uppermost edges of both the existing tank sidewalls and the tank extension sidewalls may be formed with a downwardly and inwardly turned lip to intercept the convection flow path. The tank extension may be pinned and thereby secured to the existing tank sidewalls at various elevations to optimize the freeboard height as a function of the boiling temperature of the solvent being used.

25 Claims, 6 Drawing Sheets

OPEN TOP DEFLUXER WITH IMPROVED SOLVENT VAPOR RECOVERY

TECHNICAL FIELD

The present invention relates generally to open top degreasing and defluxing apparatus and, more particularly, to a solvent vapor control system for such degreasing and defluxing apparatus

BACKGROUND ART

Open top defluxers are commonly used for removing oil and grease from metal and other parts Such an open top defluxer generally comprises an open topped tank formed from plural upright sidewalls connected to a bottom wall and into which a liquid solvent is disposed. Cleaning vapors are generated by boiling the solvent with heating elements immersed therein. The generated vapors rise within the tank to contact the parts to be cleaned which are supported in a solvent vapor zone within the tank above the liquid solvent. The vapors will dissolve the oil or grease on the parts and, optionally, the parts may be further cleaned by immersion in a rinse sump in the tank containing relatively clean liquid solvent.

Because the light rising solvent vapors have a natural tendency to escape from the tank by following a natural convection flow path upwardly along the tank sidewalls through the open top, it is desirable to control the flow path of the vapors before they can be expelled into the surrounding ambient environment. A very well known solution is the provision of a cold condenser in the form of a cold water jacket encircling the inner surfaces of the tank sidewalls which define an upper limit or a vapor line of the solvent vapor zone. The condensing coils advantageously prevent most of the light solvent vapors from rising and escaping through the open top by providing a chill zone for condensing these vapors. The condensing coils also prevent the metal walls of the defluxer from warming since, if the walls are allowed to warm, light solvent vapors are encouraged to rise and escape from the open top.

To further prevent the light solvent vapors from escaping, the tank sidewalls extend upwardly for a certain distance above the vapor line to define a freeboard region which is the height or distance between the vapor line and uppermost edges of the tank sidewalls. This freeboard region provides an additional area in which light solvent vapors rising from the vapor zone can condense without escaping from the open top.

Notwithstanding the above-identified known solutions for limiting the outflux of solvent vapor from the open top, there is still a tendency for the lighter vapor generated from the solvent to pass both the cooling coils and the overhead freeboard region and escape to the atmosphere by primarily flowing along the inner surfaces of the upright sidewalls and out through the open top. Such escape of solvent vapors results in excessive loss of solvent which renders the defluxing operating costly and results in noxious solvent odors from the defluxer causing a toxic hazard to personnel through air pollution.

At present, CFC-113 type solvents are commonly used in cleaning and defluxing of, for example, printed circuit boards following a soldering operation of component parts to the board. Since these CFC-113 solvents are substantial contributors to depletion of the ozone layer, new HCFC solvents having less deleterious harmful environmental effects than the CFC-113 solvents are becoming popular. However, these new HCFC solvents have lower boiling temperatures than the CFC-113 solvents and are more conducive to excessive loss by evaporation and escape to the atmosphere. Accordingly, there exists a greater need for controlling the loss of generated solvent vapors by the use of the new HCFC solvents in comparison with the CFC-113 solvents.

To limit the outflux of the solvent vapor from an open top defluxer, the present inventors initially experimented with the concept of extending the height of the freeboard region of the open top defluxer so that the freeboard region extended considerably above the typical engineering design criteria of 75% of the tank width. By extensive experimentation, however, and unexpectedly, the present inventors discovered that there exists an optimal freeboard region height, which is different for both the CFC-113 as well as the new HCFC solvents, above which optimal height the extent of solvent loss actually increases, presumably as a result of an increased "chimney effect." Therefore, as a result of such extensive experimentation, the inventors learned that a need exists for optimizing the height of the freeboard region in both existing and newly manufactured open top defluxers so as to enable both types of defluxers to work efficiently with either the existing CFC-113 solvents or the new HCFC solvents, as well as with other solvents having different boiling temperatures, while minimizing solvent loss.

DISCLOSURE OF THE INVENTION

It is accordingly one object of the present invention to provide a solvent vapor control system for an open top defluxer for preventing a substantial portion of the solvent vapors from being expelled into the atmosphere through the open top.

Another object of the invention is to provide a solvent vapor control arrangement for an open top defluxer which suppresses the rising of lighter vapors through the open top by redirecting the natural convection flow path of the vapors within the freeboard region of the defluxer away from the open top.

Still a further object is to provide an open top defluxer wherein uppermost edges of the vertical sidewalls of the defluxing tank are downwardly and inwardly turned to redirect solvent vapor flowing upwardly along the inner surfaces of the tank sidewalls in the freeboard region back downwardly towards the vapor line.

Yet another object is to provide a defluxer having an adjustable or removable tank extension to adjust the freeboard height as a function of a particular solvent being utilized.

Yet another object is to provide an open top defluxer suppressing the rising of lighter vapors which causes excessive solvent loss, and presents a toxic hazard to personnel and the environment through air pollution.

Yet another object of the invention is to provide an open top defluxer and a retrofit kit therefor to encourage the use of HCFC type solvents having a less harmful environmental effect.

An open top defluxer, in accordance with the present invention, comprises an open type tank formed from plural upright sidewalls connected to a bottom wall and adopted to be filled with a liquid solvent. Heating elements disposed in the tank bottom vaporize the liquid solvent. A condenser coil containing chilled refrigerant is supported within the tank above the liquid solvent for condensing the vaporized solvent and thereby defining an upper limit or vapor line of a solvent vapor zone located above the liquid solvent and below uppermost edges of the upright sidewalls. The light rising solvent vapors have a natural tendency to rise upwardly out of the tank by following a convection flow path generally along inner surfaces of the upright sidewalls and upwardly past the uppermost edges thereof. One improvement in accordance with this invention is the provision of forming the uppermost edges with a downwardly and inwardly turned lip which intercepts the convection flow path to deflect the light rising vapors approaching the uppermost edges both inwardly and downwardly back towards the condenser coil. The inwardly and downwardly turned lip impedes the escape of light rising vapors past the uppermost edges into the surrounding ambient environment.

In accordance with a different improvement feature of the present invention, a tank extension is provided for adjusting the height of the tank sidewalls to thereby vary, and optimize, the freeboard height of the tank in relation to the vapor line. Thus, for solvents having lower boiling temperatures, the tank extension enlarges the freeboard height to minimize the outflux of solvent vapors through the open top of the defluxer. When a higher boiling temperature solvent is utilized, the tank extension may be removed, or lowered, to optimize the freeboard height by reducing it for the higher boiling temperature solvents.

The two different improvement features identified above are advantageously combined by providing the uppermost edges of a tank extension with an inwardly and downwardly turned lip. In a preferred embodiment, the tank extension is formed from sidewalls which are open at the top and bottom thereof. The tank extension is attachable at its bottom portion to the existing tank sidewalls so that the tank extension sidewalls extend upwardly from and are generally coextensive with the existing tank sidewalls. Preferably, a plurality of spring-loaded pins mounted within the existing tank sidewalls are extendable to engage positioning holes formed in the tank extension sidewalls to thereby locate the tank extension in a raised position.

In accordance with other features of the invention, the bottom opening of the tank extension is dimensioned so that the inner surfaces of the tank extension sidewalls engage to cover outer surfaces of the existing tank sidewalls. The tank extension can thereby be lowered over the existing tank sidewalls until the uppermost edges of the tank extension are elevationally coextensive with the corresponding uppermost edges of the existing tank. In this mode of operation, the extension provided with an inwardly and downwardly turned lip along its upper edge can serve as a retrofit addition to a conventional open top defluxer having straight uppermost edges formed without the inwardly and downwardly turned lip.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
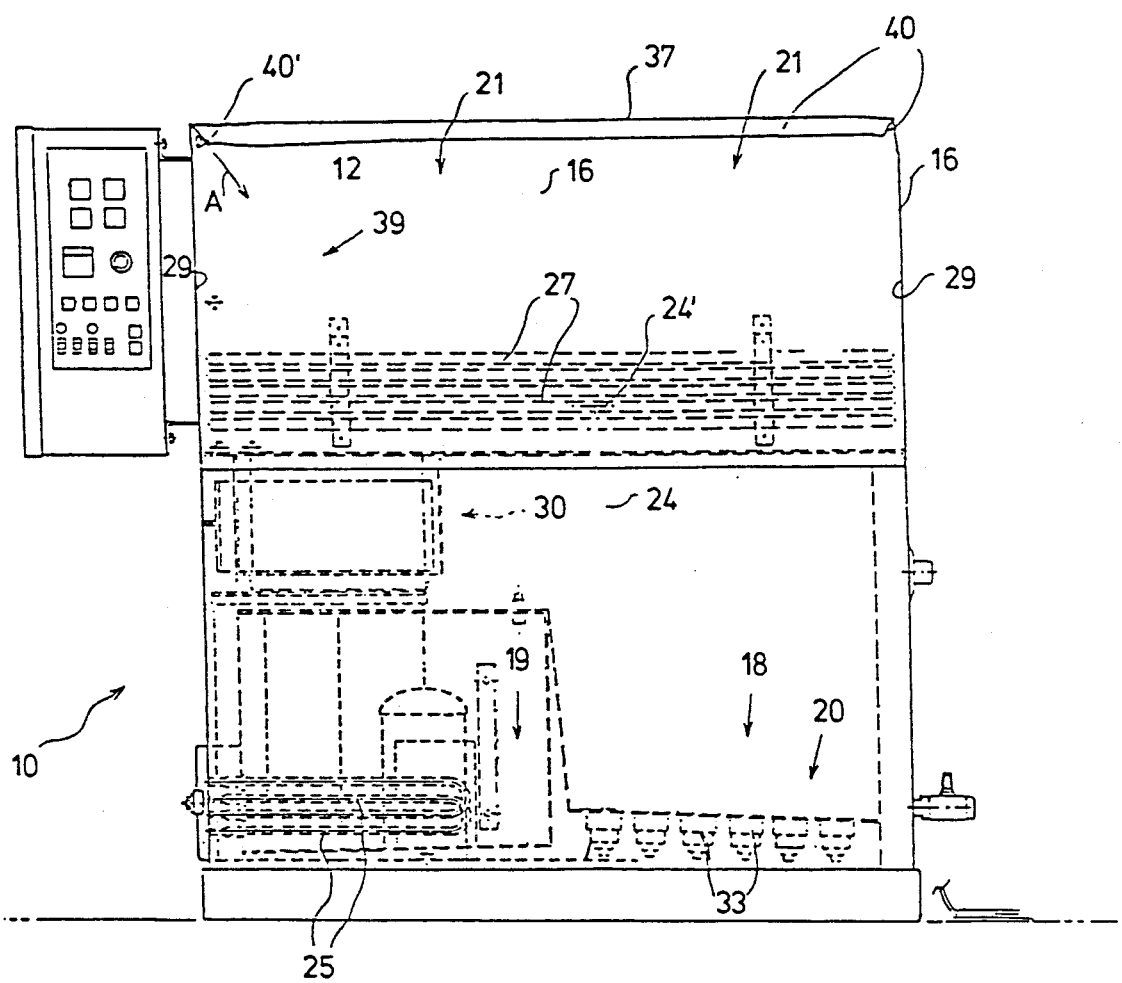
FIG. 1 is a front elevational view of an open top defluxer in accordance with the present invention.
Figure 2:
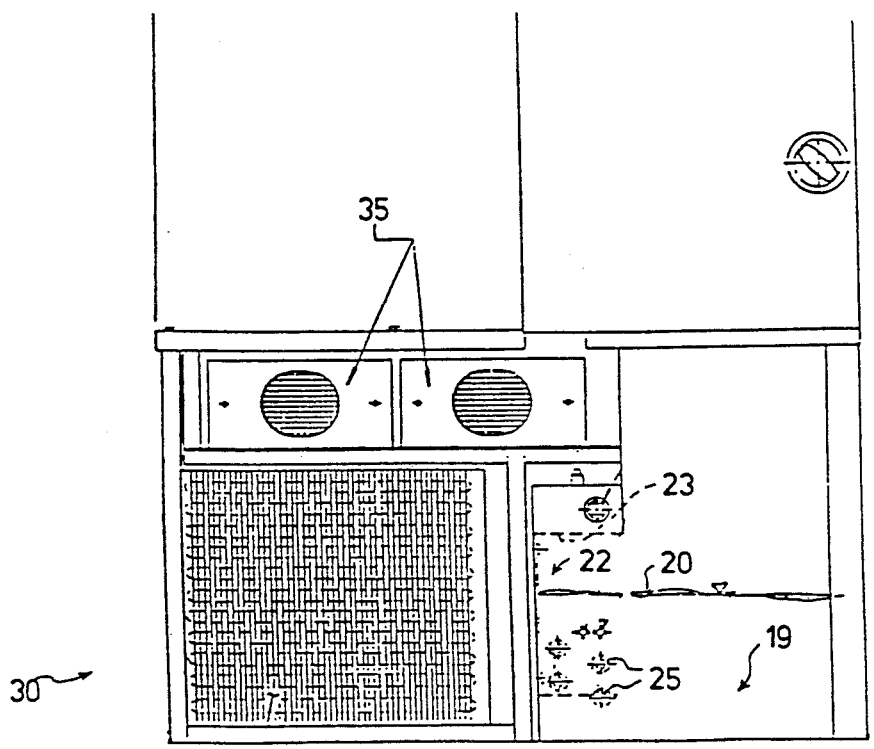
FIG. 2 is a left side elevational view of the open top defluxer of FIG. 1.
Figure 4:
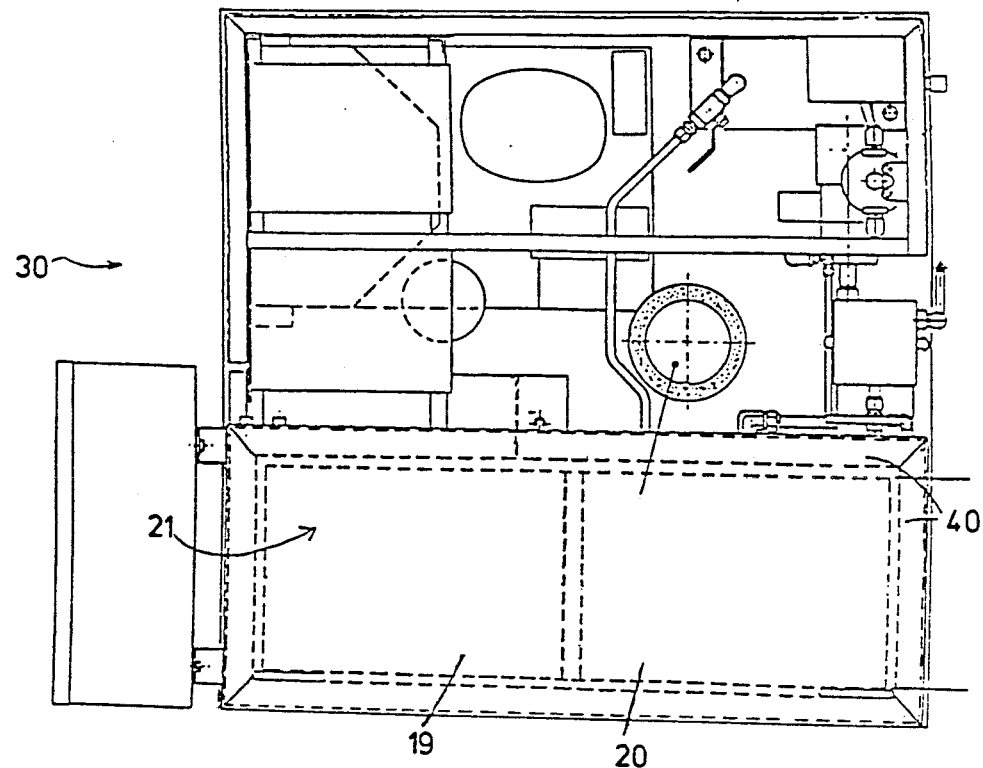
FIG. 4 is a top plan view of the defluxer of FIG. 1.
Figure 3:
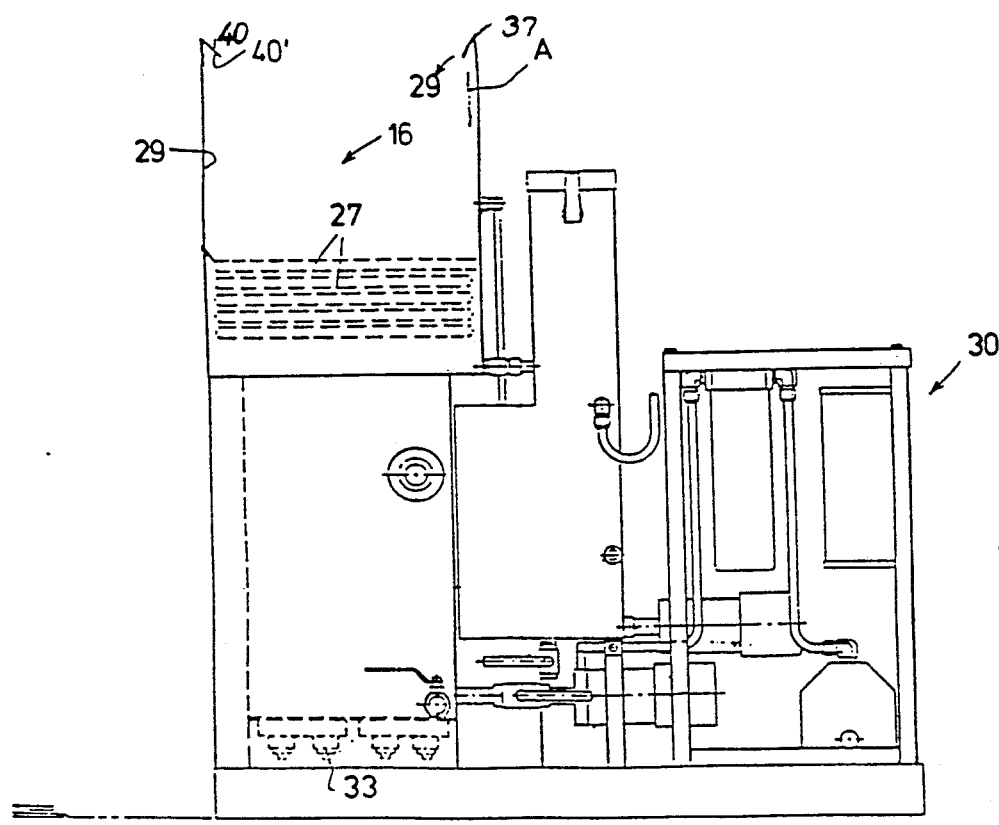
FIG. 3 is a right side elevational view of the open top defluxer of FIG. 1.
Figure 10:
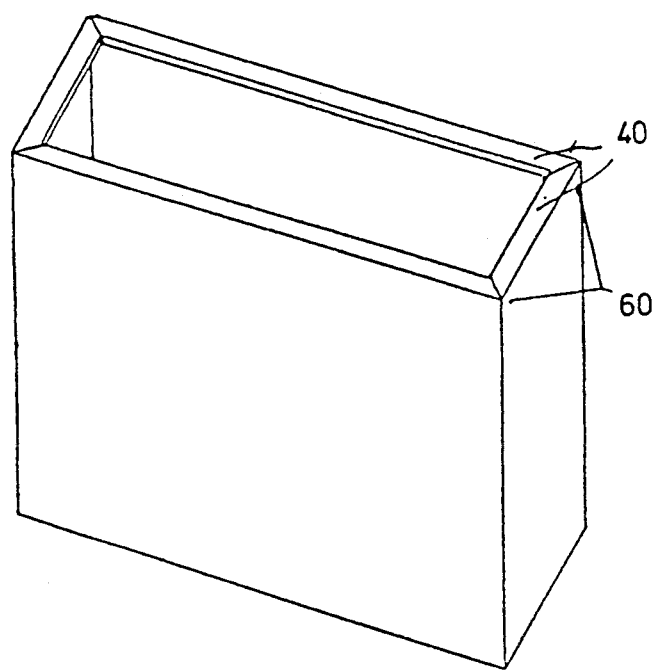
FIG. 10 is a perspective view, partially schematic, of an open top defluxer modified to have a downwardly and inwardly turned lip along its uppermost edges and spring loaded pins to receive the tank extension of the invention.

FIG. 1 is an illustration of an open top defluxer 10 formed with an open topped tank 12 having a bottom wall 14 and plural upright sidewalls 16. A solvent 18 partially fills the bottom of tank 12 in a boil sump 19 and a rinse sump 20 thereof. The boil and rinse sumps 19, 20, as best depicted in FIGS. 1 and 4, are in substantial vertical alignment with the open top 21 of the tank 12. However, with reference to FIG. 2, the boil sump 19 includes a rearwardly extending portion or side bustle 22 having an overhead, horizontally extending partition 23. Electrical heating elements 25 heat the solvent 20 to boiling temperature whereupon the solvent vapors generated by the boiling solvent within the side bustle 22 are diverted by the overhead partition 23 into the main compartment of the tank 12 to create a vapor region 24 above the solvent liquid 20 into which region parts to be degreased or defluxed are disposed on a conventional work support (not shown) for cleaning action by the vapors.

A plurality of refrigerant condensing coils 27 are supported by the upright sidewalls 16 of the tank 12. The refrigerant coils 27 extend adjacent the inner surfaces 29 of the sidewalls 16 along the four sides thereof and chilled refrigerant is supplied to the coils from a condensing unit schematically depicted at 30 in FIGS. 1-4 of the drawings. The design of the condensing unit 30 as well as the arrangement of refrigerant coils 27 within the tank 12 and their connection to the condensing unit are conventional and well known in the art.

The refrigerant coils 27 serve to cool the light rising solvent vapors as the vapors rise upwardly within the tank 12 to prevent the vapors from exiting the tank into the ambient environment through the open top 21. Thereby, the refrigerant coils 27 define an upper limit or vapor line 24' of the vapor zone 24. The condensed solvent either drips back into the boiling sump 19 for revaporization or enters the rinse sump 20 which thereby contains relatively clean, condensed liquid solvent enabling the parts to be further cleaned by immersion in the rinse sump. A set of ultrasonic transducers 33 (FIGS. 1 and 3) powered by ultrasonic generators 35 (FIG. 2) mounted to the condensing unit 30 are available to agitate the liquid solvent in the rinse sump to assist in further removal of grease on the parts being cleaned by immersion in the rinse. The design and construction of the ultrasonic transducers and generator are conventional and well known in the art.

As mentioned above, the solvent vapors within the vapor zone 24 have a natural tendency to gravitate towards the refrigerant coils 27 where most of the solvent vapors will condense and drip back to the sumps 19, 20 for recovery and reuse in the manner described above. However, a substantial portion of the light rising solvent vapors have a natural tendency to rise upwardly from the refrigerant coils 27 along the inner surfaces 29 of the upright sidewalls 16 along a convection path towards and past the uppermost edges 37 of the sidewalls 16 and into the surrounding ambient environment. The area 39 located above the vapor line 24' and below the uppermost edges 37 of the tank 12 constitutes a freeboard region wherein some of the light rising solvent vapors will further condense as additional heat is lost within the upper regions of the freeboard region. However, the light rising solvent vapor flowing along the inner surfaces 29 of the sidewalls 16 are less likely to condense since these solvent vapors are heated somewhat by the metal sidewalls of the tank located above the condensing coils. These heated solvent vapors in turn heat the air adjacent the inner surfaces 29 of the sidewalls 16 above the condensing coils 27 which further enhances the upward flow of solvent and air out of the open top of the tank by creating a "chimney effect."

Figure 6:
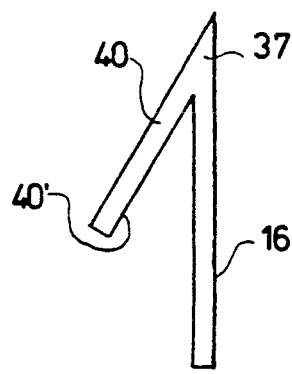
FIG. 6 is a sectional view taken along the lines 6—6 of FIG. 1.
Figure 5:
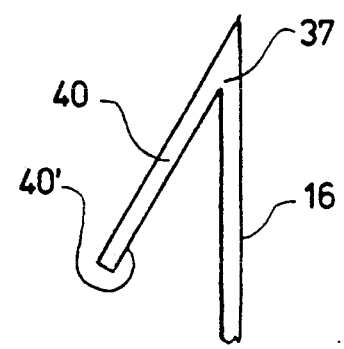
FIG. 5 is a sectional view taken along line 5—5 of FIG. 4.

To prevent the outflux of the light rising solvent vapors through the open top 21 of the tank 12 into the surrounding ambient environment, the uppermost edges 37 of the sidewalls, in accordance with an important feature of the present invention, are formed with an inwardly and downwardly extending lip 40. As best depicted in FIGS. 4-6, this lip 40 extends continuously along each uppermost edge 37 of the four sidewalls 16 and includes a lower surface 40' that is downwardly inclined in the direction away from the inner surfaces 29 of the sidewalls. In other words, the uppermost region of the lip as defined by its inner downwardly facing surface 40' is located at the point of intersection with the uppermost edge 37 of the sidewall 16 and is downwardly inclined therefrom to divert the light rising solvent vapors in the convection flow path both downwardly and towards the center of the freeboard region 39 in the direction indicated by arrows A in FIG. 1. Upon being diverted into the center area of the freeboard region 39 away from the vertical sidewalls 16, and downwardly from the open top 21, a portion of these solvent vapors will cool and therefore condense back into the rinse/boil sumps 19, 20.

As mentioned above, CFC-113 solvents are commonly utilized to deflux printed circuit boards. However, due to their adverse environmental effect, particularly on the ozone layer, HCFC solvents will become more frequently used. However, since HCFC solvents have a lower boiling point than the CFC-113 solvents, the light rising vapors of the former tend to rise more rapidly and therefore preferably require freeboard region having a greater height than the freeboard region 39 required for the CFC-113 solvents. As a result of extensive experimentation to determine whether there exists an optimal height at which the outflux of solvent vapors of both HCFC and CFC-113 solvents were minimized, it was discovered (1) that there is a point at which extension of the freeboard height for a particular solvent, as a function of boiling temperature, will actually cause the solvent vapor to outflux from the open top to a greater extent than if the height of the freeboard was maintained at the optimum height, and (2) that the optimum freeboard height is approximately 100% of the tank width for CFC-113 solvents and 135% of the tank width for HCFC solvents.

As a result of the foregoing, and in accordance with another important feature of the present invention, there is provided a tank extension 50 formed with extension sidewalls 52 having lower edges 54 defining a bottom opening 56 and upper edges 58 defining a top opening 60. The tank extension 50 is configured, in a preferred embodiment, for positioning upon the open top 21 of the defluxer 10 so as to extend the height of the freeboard region 39 to enable use of the defluxer with solvents having lower boiling temperatures, such as HCFC solvents. More specifically, the bottom opening 56 of the tank extension 50 is configured such that, in the elevated position depicted in FIG. 8, the inner surfaces 52a of the tank extension sidewalls 52 engage to overlap and cover the outer surfaces 16a of the existing tank sidewalls 16 to effectively extend the height of the freeboard region 39. To maintain the tank extension in its elevated position, retractable positioning pins 60 are mounted to the existing tank sidewalls 16 and are extendable outwardly from the outer surfaces 52 of these walls to engage adjustment holes 62 formed in corresponding positions on the tank extension sidewalls 52. By providing a plurality of adjustment holes 62 in the tank extension sidewalls 52 in vertically spaced relationship to each other (it will be appreciated that sealing means such as removable grommets 63 may be provided in the unused holes), it is possible to mount the tank extension 50 to the existing tank sidewalls 16 at various elevations to optimize the use of the defluxer 10 for a particular solvent.

Figure 8:
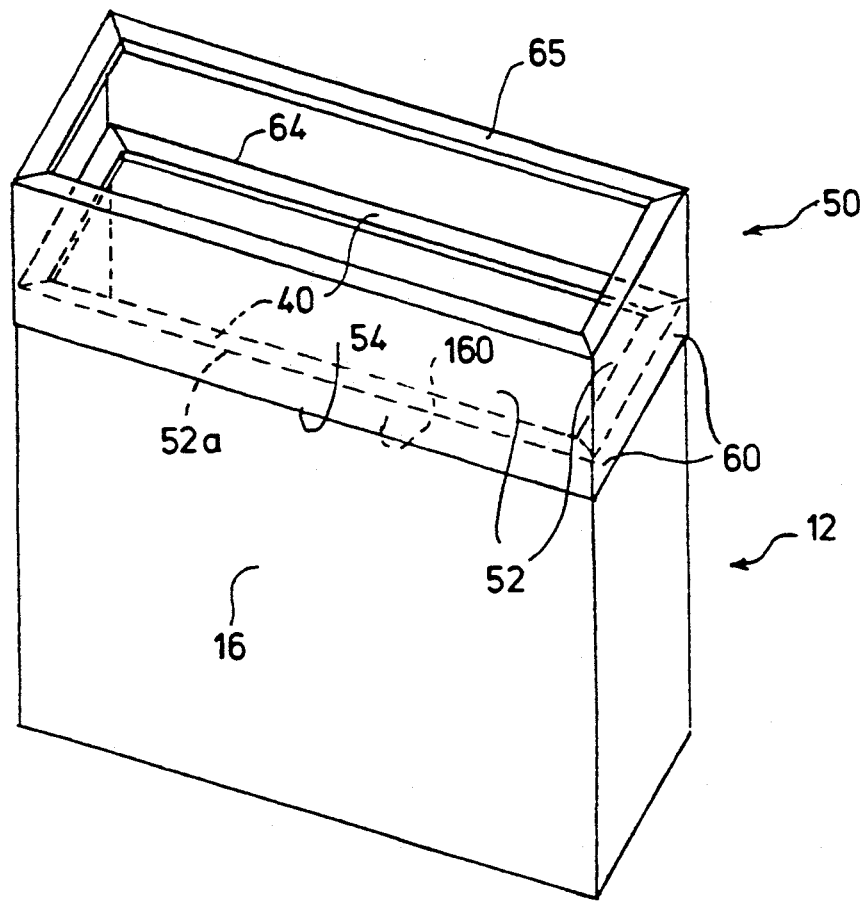
FIG. 8 is a perspective view of the tank extension of FIG. 7 mounted to the open top of a defluxer to increase the freeboard height.

Optionally, a sealing gasket 64 may be disposed between the overlapping tank extension sidewalls 52a and the existing tank sidewalls 16a to prevent solvent vapor condensing on the inner surfaces 52a of the tank extension sidewalls from entering a space between the overlapping sidewalls and running down the outer surfaces 16a of the existing tank sidewalls, as depicted in FIG. 8.

Figure 11:
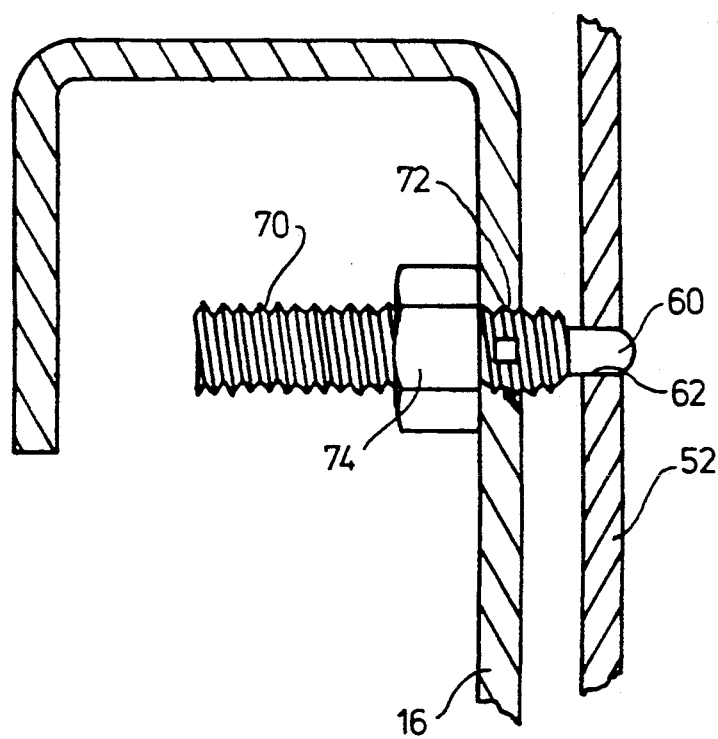
FIG. 11 is a detailed sectional view depicting a spring loaded adjustment pin in the tank side wall in engagement with a tank extension side wall.

FIG. 11 is an illustration of one form of mounting positioning pin 60 to the tank side wall 16. Therein, a threaded bolt 70 is threadedly received in a threaded opening 72 of an upper portion of the tank side wall 16. The spring loaded positioning pin 60 projects outwardly from one end of bolt 70 extending through threaded opening 72. The spring loaded pin 60 is maintained in a normally spring biased extended position by means of a spring (not shown in detail) received within a bore into which one end of pin 60 is received. A nut 74 can be provided to regulate the extent to which pin 60 projects from tank wall 16.

Figure 9:
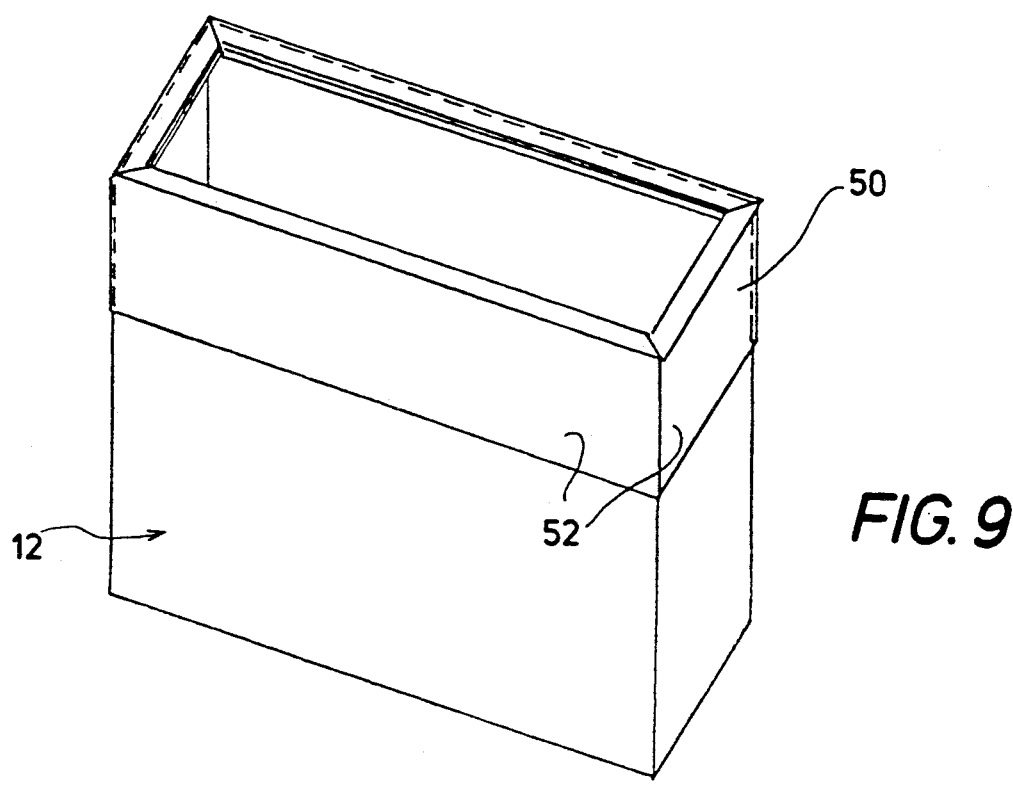
FIG. 9 is a view similar to FIG. 8 of the tank extension in a fully nested position on the open top defluxer.
Figure 7:
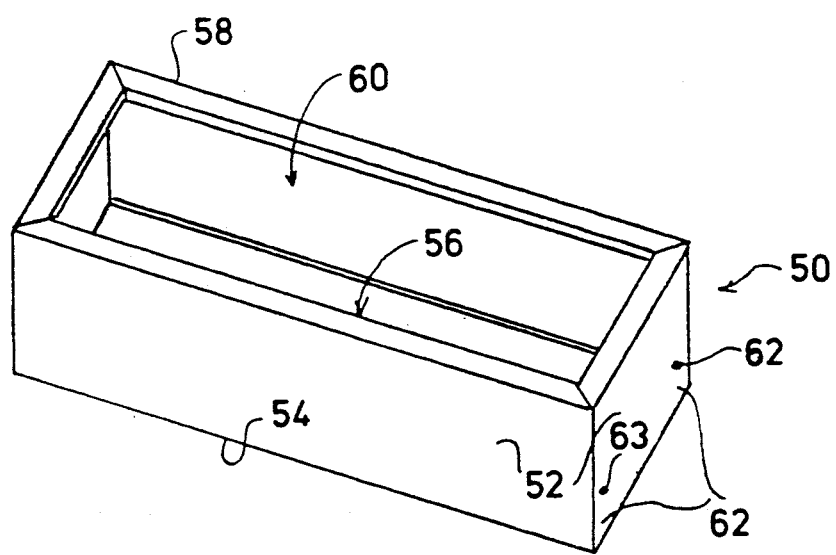
FIG. 7 is a perspective view of a tank extension in accordance with the present invention.

It is within the scope of the present invention to provide the tank extension 50 without a downwardly and inwardly turned lip along its uppermost edges 58 on a defluxing tank 10 also formed without the inwardly and downwardly turned lip 40 (i.e., a conventional tank) so as to enable the tank extension to effectively increase the height of the freeboard region 39 in the manner described above to minimize solvent vapor loss. However, in accordance with the present invention, it is a preferred feature that the tank extension sidewalls 52 are also formed with a downwardly and inwardly extending lip 65 (corresponding to the cross-sections depicted in FIGS. 6 and 7) along the sidewall uppermost edges 58. The tank extension 50 of the present invention, with or without the lip 65, may therefore be used in conjunction with a defluxer wherein the existing tank sidewall uppermost edges 37 are formed either with or without a corresponding lip 40. By forming the downwardly and inwardly extending lip 65 on the uppermost edges 58 of the tank extension sidewalls 52, it will be appreciated that the tank extension lip, in the fully nested position of the tank extension depicted in FIG. 9, will effectively function as the lip formed on the uppermost edges of the existing tank sidewalls (formed without lip 40). Of course, the tank extension 50 formed with the deflecting lip 65 may also be utilized in conjunction with a defluxing tank 10 which is also formed with a deflecting lip 40 (FIG. 8) in which case, in the nesting position (not shown), the lips thusly formed will fully nest upon each other. In the elevated position of FIG. 8, it will be appreciated that two vertically spaced deflecting lips 40, 65 will thusly be presented within the freeboard region 39 and along the uppermost edges 58 of the tank extension to further disrupt the natural convection flow path of the light rising solvent vapors.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In an open top defluxer comprising an open topped tank formed from a plurality of upright sidewalls connected to a bottom wall and adapted to be filled with a liquid solvent; means for vaporizing the liquid solvent; condenser coil means supported within the tank above the liquid solvent for condensing solvent vapors and thereby defining an upper limit or vapor line of a solvent vapor zone located above the liquid solvent and below uppermost edges of the upright sidewalls; wherein the light rising solvent vapors has a natural tendency to rise upwardly out of the tank by following a convection flow path generally along the inner surfaces of the upright sidewalls and upwardly past the uppermost edges thereof;

the improvement comprising said uppermost edges including downwardly and inwardly turned lip means for intercepting the convection flow path to deflect the light rising vapors approaching the uppermost edges both inwardly and downwardly back towards the condenser coil means, thereby impeding the escape of said light rising vapors past said uppermost edges into the surrounding ambient environment and further comprising means for adjusting the height of the sidewalls, relative to said uppermost edges, to thereby vary the freeboard height of the tank in relation to the vapor line.

2. The open top defluxer of claim 1, wherein the downwardly and inwardly turned lip means includes said uppermost edges being both downwardly and inwardly turned.

3. The open top defluxer of claim 2, wherein said downwardly and inwardly turned edges extend both downwardly and inwardly along the entire extent of each said sidewall.

4. The defluxer of claim 1, wherein the sidewall height adjustment means is removably attachable to the tank sidewalls so as to extend upwardly from said uppermost edges.

5. The open top defluxer of claim 4, wherein said sidewall height adjustment means includes a tank extension having sidewall means being open at the top and bottom thereof, and means for attaching the tank extension at its bottom portion to the existing tank sidewalls so that the tank extension sidewall means extends upwardly from and generally co-extensive with the existing tank sidewalls.

6. The open top defluxer of claim 5, wherein said uppermost edges of the sidewall means of the tank extension are inwardly and downwardly turned.

7. The open top defluxer of claim 5, wherein said attaching means comprises connecting pin means for pinning to secure the tank extension to the existing tank sidewalls.

8. The open top defluxer of claim 6, wherein said attaching means comprises connecting pin means for pinning to secure the tank extension to the existing tank sidewalls.

9. The open top defluxer of claim 5, wherein said attaching means includes means for varying the height of the tank extension in relation to the existing tank sidewalls.

10. The open top defluxer of claim 6, wherein said attaching means includes means for varying the height of the tank extension in relation to the existing tank sidewalls.

11. The open top defluxer of claim 5, wherein the bottom opening of the tank extension is sized so that the inner surfaces of the tank extension sidewall means engage to overlap the outer surfaces of the existing tank sidewalls, and gasket means disposed between the overlapping tank extension sidewall means and existing tank sidewalls for preventing solvent vapor condensing on the inner surfaces of the tank extension sidewall means from entering a space between the overlapping sidewalls and running down the outer surfaces of the existing tank sidewalls.

12. In an open top defluxer comprising an open topped tank formed from a plurality of upright sidewalls connected to a bottom wall and adapted to be filled with a liquid solvent; means for vaporizing the liquid solvent; condenser coil means supported within the tank above the liquid solvent for condensing solvent vapors and thereby defining an upper limit or vapor line of a solvent vapor zone located above the liquid solvent and below uppermost edges of the upright sidewalls; wherein the light rising solvent vapors has a natural tendency to rise upwardly out of the tank by following a convection flow path generally along the inner surfaces of the upright sidewalls and upwardly past the uppermost edges thereof;

the improvement comprising means for adjusting the height of the tank sidewalls, relative to said uppermost edges, to thereby vary the freeboard height of the tank in relation to the vapor line.

13. The open top defluxer of claim 12, wherein uppermost edges of said sidewall height adjustment means include downwardly and inwardly turned lip means intercepting the convection flow path to deflect the light rising vapors, approaching the uppermost edges of the height adjustment means, both inwardly and downwardly back towards the condenser coil means, thereby impeding the escape of said light rising vapors past the uppermost edges of the height adjustment means into the surrounding ambient environment.

14. The open top defluxer of claim 13, wherein the downwardly and inwardly turned lip means includes said uppermost edges of the height adjustment means being both downwardly and inwardly turned.

15. The open top defluxer of claim 14, wherein the edges of the height adjustment means are downwardly and inwardly turned along the entire extent of the height adjustment means which entire extent corresponds to the length and widthwise dimensions of the tank sidewalls.

16. The open top defluxer of claim 12, wherein the sidewall height adjustment means is removably attachable to the tank sidewalls so as to extend upwardly from said tank uppermost edges.

17. The open top defluxer of claim 15, wherein the sidewall height adjustment means is removably attachable to the tank sidewalls so as to extend upwardly from said tank uppermost edges.

18. The open top defluxer of claim 16, wherein said sidewall height adjustment means includes a tank extension having sidewall means being open at the top and bottom thereof, and means for attaching the tank extension at its bottom portion to the existing tank sidewalls so that the sidewall means extends upwardly from and are generally co-extensive with the existing tank sidewalls.

19. The open top defluxer of claim 17, wherein said sidewall height adjustment means includes a tank extension having sidewall means being open at the top and bottom thereof, and means for attaching the tank extension at its bottom portion to the existing tank sidewalls so that the sidewall means extends upwardly from and are generally co-extensive with the existing tank sidewalls.

20. The open top defluxer of claim 18, wherein said attaching means comprises connecting pin means for pinning to secure the tank extension to the existing tank sidewalls.

21. The open top defluxer of claim 19, wherein said attaching means comprises connecting pin means for pinning to secure the tank extension to the existing tank sidewalls.

22. The open top defluxer of claim 20, wherein said attaching means includes means for varying the height of the tank extension in relation to the existing tank sidewalls.

23. The open top defluxer of claim 21, wherein said attaching means includes means for varying the height of the tank extension in relation to the existing tank sidewalls.

24. The open top defluxer of claim 22, wherein the bottom opening of the tank extension is sized so that the inner surfaces of the tank extension sidewall means engages to overlap the outer surfaces of the existing tank sidewalls, and gasket means disposed between the overlapping tank extension sidewall means and existing tank sidewalls for preventing solvent vapor condensing on the inner surfaces of the tank extension sidewall means from entering a space between the overlapping sidewalls and running down the outer surfaces of the existing tank sidewalls.

25. The open top defluxer of claim 23, wherein the bottom opening of the tank extension is sized so that the inner surfaces of the tank extension sidewall means engages to overlap the outer surfaces of the existing tank sidewalls, and gasket means disposed between the overlapping tank extension sidewall means and existing tank sidewalls for preventing solvent vapor condensing on the inner surfaces of the tank extension sidewall means from entering a space between the overlapping sidewalls and running down the outer surfaces of the existing tank sidewalls.

* * * * *